No. 678,791.  
W. M. FORD.  
PLAYING CARDS.  
(Application filed Nov. 25, 1898. Renewed Nov. 2, 1900.)

Patented July 16, 1901.

(No Model.)

FIG. 2

BORN AT AMHERST, N.H., OF SCOTCH-IRISH DESCENT. HIS EARLY EDUCATION WAS CONFINED TO INSTRUCTION FROM HIS MOTHER AND WINTER SCHOOLS; AT FOURTEEN WAS APPRENTICED TO A PRINTER, SHOWED GREAT APTNESS FOR ALL BRANCHES OF THE BUSINESS AND A MARKED TASTE FOR POLITICS. HE WENT TO NEW YORK IN 1831 AND AFTER SEVERAL MORE OR LESS SUCCESSFUL NEWSPAPER VENTURES, STARTED WITH FRANCIS STORY THE DAILY TRIBUNE, THE FIRST PENNY DAILY, WHICH SOON ATTAINED A WIDE CIRCULATION. HE SUPPORTED CLAY IN 1844, AND IN LATER ELECTIONS, SCOTT, FREMONT AND LINCOLN, BEING OF THE SOME TIME THE GREATEST LEADER OF HIS PARTY. HE WAS BITTERLY OPPOSED TO SLAVERY, OPPOSED THE MEXICAN WAR, SUPPORTED THE CIVIL WAR WITH ALL HIS STRENGTH AT THE CLOSE ADVOCATED UNIVERSAL AMNESTY AND UNIVERSAL SUFFRAGE AND SIGNED THE BAIL BONDS OF JEFFERSON DAVIS. IN 1872 HE WAS NOMINATED FOR THE PRESIDENCY, BUT WAS DEFEATED. THE EXCITEMENT OF THE CAMPAIGN, TOGETHER WITH HIS WIFE'S DEATH, BROUGHT ON BRAIN FEVER, WHICH ENDED HIS LIFE AT PLEASANTVILLE.

BORN AT ......

FIG. 1

HORACE GREELEY.  
BORN FEB. 3, 1811.  
DIED NOV. 29, 1872.

1. WHO FOUNDED THE NEW YORK "TRIBUNE"?
2. WHOM DID WHITTIER SPEAK OF AS "OUR LATER FRANKLIN"?
3. WHOSE FAMOUS ADVICE WAS, "YOUNG MAN, GO WEST"?
4. WHO ADDRESSED A PUBLIC LETTER TO PRESID'T LINCOLN ENTITLED "THE PRAYER OF 20 MILLIONS"?
5. WHOSE PRINCIPAL WORK IS "THE AMERICAN CONFLICT"?
6. WHOSE PICTURE? 7. WHOSE BIOGRAPHY?

J. FENIMORE COOPER.  
BORN SEPT. 15, 1789.  
DIED SEPT. 14, 1851.

1. WHAT AMERICAN NOVELIST WROTE A HISTORY OF THE U.S. NAVY?
2. WHO MAY TRULY BE CALLED THE FIRST AMERICAN NOVELIST?
3. WHO HAS PICTURED SEA-LIFE MOST VIVIDLY IN "THE PILOT" AND "RED ROVER"?
4. TO WHOM DOES THE N.A. REVIEW GIVE THE CREDIT OF LAYING THE FOUNDATION OF AMERICAN ROMANCE?
5. WHO HAS SUCCEEDED BEST IN PORTRAYING AMERICAN CHARACTER AND AMERICAN SCENERY?
6. WHOSE PICTURE? 7. WHOSE BIOGRAPHY?

WITNESSES:  
Charles B Martin

INVENTOR  
William Morris Ford  
BY  
Alfred Meltzer  
his ATTORNEY.

THE NORRIS PETERS CO., PHOTO-LITHO., WASHINGTON, D. C.

UNITED STATES PATENT OFFICE.

WILLIAM MORRIS FORD, OF CHICAGO, ILLINOIS.

PLAYING-CARD.

SPECIFICATION forming part of Letters Patent No. 678,791, dated July 16, 1901.

Application filed November 25, 1898. Renewed November 2, 1900. Serial No. 35,221. (No model.)

*To all whom it may concern:*

Be it known that I, WILLIAM MORRIS FORD, a citizen of the United States of America, and a resident of Chicago, county of Cook, and State of Illinois, have invented certain new and useful Improvements in Playing-Cards, of which the following is a specification.

My invention relates to playing-cards, and has particular reference to an educational card-game.

The nature of my invention and the means in which it is applied will be understood from the following description, with reference to the accompanying drawings, in which—

Figure 1 represents the face of one of a set of cards made according to my invention. Fig. 2 represents the back of the same card, the lower half of the reading-matter thereon being omitted and its position merely indicated.

In putting my invention into practice I provide a set of cards each having on its face the name or names of different subjects, with pictorial illustrations and printed questions regarding same. On the back of each card is a printed description of the subject or subjects named on the front. The name of the subject does not appear on the back. The set to which the card illustrated in the accompanying drawings belongs is a biographical set consisting of seventy cards. The number of cards comprising a set, it is plain, may be varied at will.

On the card shown in the drawings the first subject is "Horace Greeley." His picture and name are so arranged that the latter may be covered by the finger of a player when exhibiting the picture to another player. The printed questions accompanying the picture and name are such as would suggest the subject to one familiar with his biography. On the back of the card shown in Fig. 2 is the printed biography. It will be readily seen that the same idea may be applied to the study of places of historical importance and to other subjects of interest.

The value from an educational standpoint of presenting the subject in the manner shown will be better understood from the following description of a game which may be played with these cards.

Any number of players may take part. One of the players distributes the cards one at a time until each player has three. The remainder of the pack is placed face downward on the table. The distributer then asks the first player on his left the first question in the upper section from any card in his hand. If such player answers the question correctly, he wins the card and turns same face downward before him on the table. If he fails to answer the question correctly, the next player to his left is given an opportunity to do so, and thus the question is passed around the circle. If no player answers it correctly, then the player who asks the question reads aloud the biography or data on the back of the card relating to the subject of said question. The players are then given another opportunity in turn to name the subject. Should all again fail, the distributer discards the card and draws another from the top of the pack. The first player to the left of the distributer then takes his turn at asking, and so on, each taking his turn no matter who answers. Whenever a player discards a card or gives up one he must draw another from the top of the pack, so that each player has three cards all the time.

Each question is numbered and must be played as follows: Question No. 1 in the upper section of each card must be asked until all of the cards have been played or discarded. They are then mixed and distributed by the first player to the left of the former distributer. Question No. 2 is then played in the manner hereinbefore described for question No. 1. Each question is then thus played in its proper order until the questions in both sections of the cards have been played.

Each run of cards may be called again, the person having the highest number of cards at the end being the winner.

The description on the back and the picture may be used in connection with each of the first five questions, if desired—that is, if all players fail to answer the question and also fail to name the subject after the reading of the description on the back then the picture may be shown before discarding. In showing the picture the player will cover the name of the subject with his finger.

The manner of playing the game, it is plain, may be varied. The description should give no facts which are not suggested by the questions. The idea, it will be seen, may be applied to any class of subjects capable of pictorial illustrations.

The picture, questions, description, and names of the subject may all appear on the face of the cards, if desired. I prefer, however, to have the description on the back without the name or picture, so that, if desired, one round may be played by laying the cards face down and reading the description before any player sees the matter on the face. When thus played, the person reading may answer and win the card if the others fail.

I am aware that playing-cards having thereon the picture of a noted person with the name of the subject and printed questions regarding same are old, and that such cards are used in the old game of "Authors." I therefore do not claim such features broadly.

What I claim, and desire to secure by Letters Patent, is—

A set of playing-cards comprising a plurality of cards each having on one surface the picture and name of a subject, and printed questions suggesting, but not naming the subject; and on the opposite surface a printed description, suggesting, but not naming said subject; each card in said set pertaining to a different subject; substantially as described.

Signed by me at Chicago this 13th day of June, 1898.

WILLIAM MORRIS FORD.

Witnesses:
  WM. R. RUMMLER,
  ALFRED MELTZER.